United States Patent [19]

Vandling

[11] 4,246,492
[45] Jan. 20, 1981

[54] METHOD OF AND APPARATUS FOR LOAD AND/OR LOAD CONTROL SIGNALING TO CUSTOMERS IN A POWER SYSTEM

[76] Inventor: John M. Vandling, Hoanjovo La., Pleasantville, N.Y. 10570

[21] Appl. No.: 856,757

[22] Filed: Dec. 2, 1977

[51] Int. Cl.³ .............................................. H02J 13/00
[52] U.S. Cl. ..................................... 307/40; 361/182; 307/129
[58] Field of Search ........................... 307/129, 18–20, 307/29, 31, 34, 35, 39, 40; 340/171 R, 163, 288; 361/78, 182, 183

[56] References Cited
U.S. PATENT DOCUMENTS

| 3,558,911 | 1/1971 | Chen ............................ 307/129 |
| 3,639,810 | 2/1972 | Schleif .......................... 307/152 |
| 3,683,343 | 8/1972 | Feldman ....................... 340/178 |

Primary Examiner—Michael L. Gellner
Assistant Examiner—S. D. Schreyer
Attorney, Agent, or Firm—Woodcock, Washburn, Kurtz, Mackiewicz & Norris

[57] ABSTRACT

Information is conveyed from a generating site to a consuming location in an electric power system by varying the frequency of the power from the nominal standard generating frequency. The signaled variation in frequency is detected at a power controlling or consuming location and a frequency indicating signal is generated. Frequency deviations of predetermined magnitude for predetermined time duration signal a selected range of power system load while different deviations for different times signal automatic remote control of certain predetermined loads or other functions.

10 Claims, 4 Drawing Figures

METHOD OF AND APPARATUS FOR LOAD AND/OR LOAD CONTROL SIGNALING TO CUSTOMERS IN A POWER SYSTEM

BACKGROUND OF THE INVENTION

This invention relates to a method and apparatus for signaling a power consuming location of load conditions.

It is generally recognized that the electric power generating capacity is not, at the present time, utilized efficiently. This inefficiency results from the fact that the load on the power generating system is not distributed evenly throughout a 24-hour day. There are peak periods in which the load is extremely heavy and the full capacity of the power generating is demanded, and there are light periods in which there is an excess of power generating capacity. The result has been a power generating system which is often overloaded during peak periods of load and inefficient during light periods. This unbalanced condition has increased pressure to expand the power generating capacity to better handle the peak load periods with a resulting increase in inefficiency during the light periods.

In an effort to smooth out the peaks and valleys in power consumption, power companies encourage the reduction of optional load, e.g., residential air conditioners, during typical peak load periods. In some instances, the optional load has been removed from the system by means of a time clock.

U.S. Pat. No. 3,683,343—Feldman et al discloses a system wherein signals are superimposed on the power lines so as to indicate loads in the system thereby providing the customer with an indication of the load. The superimposed signals are also utilized to determine the scale factor of a meter so as to provide the customer with a variation in electric rates depending upon the load condition on the power system.

Despite the above-mentioned efforts to achieve certain efficiency and economy in the power generating systems, there has been no wide-scale, consistent use of such technqiues. The use of time clocks has been less than satisfactory since the load conditions at a certain time on one day may differ considerably from the load conditions at the same time on another day. Superimposing load condition signals on the power lines along with the power generating frequency has also met with little if no use. This may in part be attributable to the cost of installing the additional signaling equipment at the generating source. Such signaling equipment may also be less than desirable under circumstances where electrical noise erroneously indicates a change in load. Furthermore, superimposing a signal on the power lines might be fraudulently duplicted so as to permit the benefit of a reduced rate during a peak load period where varying metering rates are provided.

SUMMARY OF THE INVENTION

It is an object of this invention to provide a method of and apparatus for communicating information relating load and/or load control between a power generating location and a power consuming location or power load controlling location without requiring carrier current or other superimposed signals.

It is a further object to provide a system readily available to any consuming or controlling locations without need for communication means other than the same electrical circuit by which power is delivered to the consuming location.

It is also an object of this invention to reduce the need to impose brownouts or blackouts as a means of reducing load in overloaded peak periods.

It is also an object of this invention to provide a method of and apparatus for communicating load and/or load control information which is substantially immune from electrical noise.

It is a further object of this invention to provide a method of and apparatus for communicating load and/or load control information which is substantially immune to fraud on the part of the utility and the consumer alike.

It is a still further object of this invention to provide an economic incentive to encourage power consumption during off-peak load periods.

In accordance with these and other objects of the invention, power is generated for the system at a nominal frequency at one or more power generating locations which may be connected to a common power grid and a load including a plurality of power consuming locations is changed periodically. The frequency of the power is varied from a nominal standard to signal load and/or load control information and the frequency of the power may be varied in a different manner to convey additional information without signaling load and/or load control information.

In further accordance with the objects of this invention, a variation in the frequency signaling load and/or load control information is detected at power consuming locations while variations in the frequency not signaling load and/or load control information are ignored. A load indicating signal is then generated at the power consuming location only in response to the detected variation signaling load and/or load control information.

The load indicating signal may be then utilized to operate a load indicating device such as an illuminated display so as to advise the consumer of the load conditions. The load indicating signal may also be utilized to directly control the load so as to remove the need for manual operation by the consumer. In addition, the load indicating signal may be utilized to control a KWH meter so as to operate the KWH meter at different rates per KWH depending upon the load conditions.

In a particularly preferred embodiment of the invention, the variation in frequency signaling load and/or load control information comprises a frequency deviation of predetermined magnitude where subsequently detected frequencies closer to the nominal standard frequency than the frequency deviation of predetermined magnitude will continue to produce the same load indicating signal until a reset frequency is detected. More than on frequency deviation of predetermined magnitude may be provided so as to indicate additional load conditions.

In a particularly preferred embodiment of the invention, apparatus is provided wherein measuring means measure the generating frequency and storage means coupled to the measuring means store a signal representing the predetermined deviation in the generating frequency. Signal means coupled to the storage means generate a signal representing a load condition and reset means coupled to the measuring means generate a reset signal coupled to the storage means when the frequency reaches a predetermined reset value. The measuring means may comprise a source of accurate and equally spaced clock pulses substantially independent of the generating frequency and reset means coupled to the counter means for periodically resetting the counter means in synchronism with the generating frequency such that the count of the counter means is indicative of the generating frequency.

The apparatus further comprises a decoder means coupled to said counter means for generating an output when said counter means reaches a predetermined count corresponding to the nominal standard frequency and additional counter means coupled to the decoder means, the source of clock pulses and the reset means for generating the count indicative of the variation in frequency from the nominal frequency upon resetting. The additional counter means may comprise an up/down counter means and control means and counting down therefrom until a count corresponding to the nominal standard of the generatng frequency is reached and counting up thereafter.

In accordance with another important aspect of this invention, variations in frequencies may be detected at different times at different power consuming locations so as to accommodate phased loading of a power system extending across a plurality of time zones. This permits the generating frequency to be varied for all power consuming locations at the same time but only selected power consuming locations will be responsive to a frequency variation within a specific time frame.

DETAILED DESCRIPTION OF PREFERRED EMBODIMENTS

Figure 1:
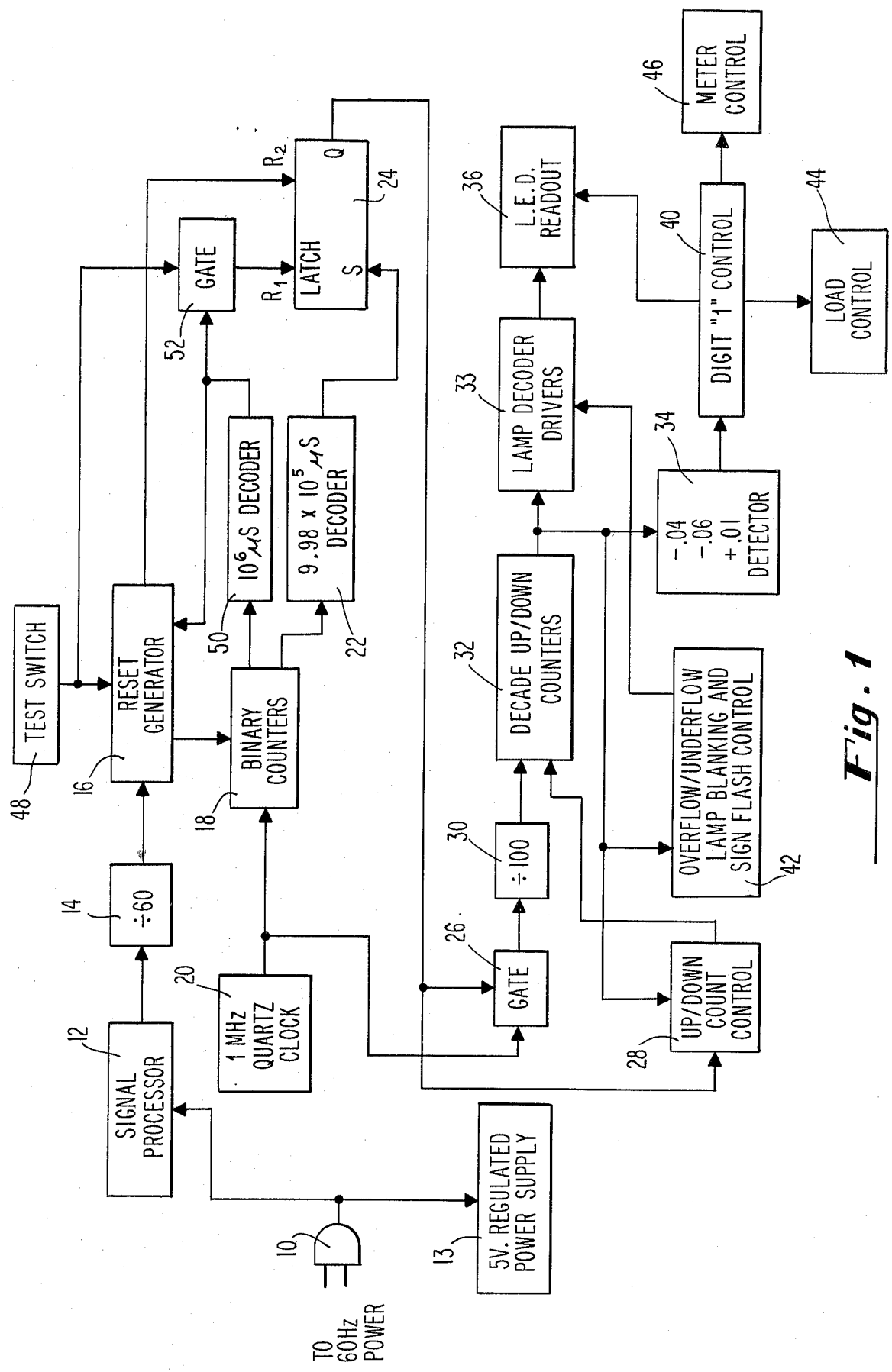
FIG. 1 is a block diagram of a preferred embodiment of the invention.

Referring to FIG. 1, apparatus is disclosed which is adapted to be connected to a power line at a power consuming location by means of a plug 10 for use in detecting the variations in generating frequency from a nominal standard which is indicative of a change in load conditions while ignoring changes or deviation in frequency from the nominal standard which are not indicative of changes in load conditions.

The power generating frequency at the plug 10 is applied to a signal processor 12 which amplitude limits and filters the generating frequency signal received. The output from the signal processor 12 comprises a pulse train having a frequency corresponding to the generating frequency which is then applied to a frequency divider 14 so as to generate an output pulse after a predetermined number of power generating cycles. In the preferred embodiment of the invention, the generating frequency is nominally 60.00 Hz. The frequency divider 14 divides by 60 so as to achieve a pulse for each 60 cycles of power. The pulses from the output of the frequency divider 14 are applied to a reset generator 16 which is utilized to generate output reset pulses which are applied to binary counters 18 so as to measure the frequency deviation or frequency change in the following way.

A source 20 of clock pulses at a frequency of 1 MHz. is applied to the binary counters 18 so as to provide an input to the counters of 1 microsecond clock pulses. Since the binary counters 18 will be reset in response to output reset pulses from the reset generator 16, the count accumulated in the counters 18 during 60 power cycles is indicative of the generating frequency.

In accordance with this invention, a decoder 22 is coupled to binary counters 18 which sets a latch 24 at input S which generates a control signal at output Q for a gate 26 and an up/down count control 28. In the preferred embodiment of the invention illustrated, the decoder 22 is responsive to a count of $9.98 \times 10^5$ clock pulses, i.e., the number of clock pulses accumulated in $9.98 \times 10^5$ microseconds. When this count is accumulated corresponding to a time lapse just under one second, the output Q of the latch 24 will open the gate 26 so as to allow clock pulses from the source 20 to flow through the gate 26. By providing a frequency divider 30 which divides by 100, the clock pulses flowing from the gate 26 once the latch 24 is set will, upon application to decade up/down counters 32, indicate a percentage of the actual power generating frequency. In this connection, the up/down count control 28 presets a count of 20 in the counters 32 and the clock pulses from the gate 26 divided by the divider 30 counts down to a count of zero after 2000 microseconds. The count of zero from the counters 32 is applied back to the up/down count control 28 so as to instruct the counters 32 to count up. The counters 32 will count down and subsequently count up until such time as an inhibit signal from the latch 24 inhibits the gate 26. This then indicates the end of a measuring cycle of the generating frequency and the accumulated count in the counters 32 accordingly indicates the percentage deviation of the generating frequency from 60.00 Hz. From the foregoing, it should be understood that one pulse will be presented to the counters 32 every 100 microseconds when gate 26 is open.

The output from the counters 32 is applied to a detector which detects the actual deviation from 60.00 Hz. More specifically, the detector 34 is adapted to detect deviations of −0.04%, −0.06% and +0.01%. As will be described subsequently, the detector 34 is capable of ignoring variations or deviations in the generating frequency closer to the nominal frequency, e.g. 60.00 Hz. For example, the detector 34 will not be responsive to frequency deviations of 0 to −0.03% before or after −0.04% has been detected. Rather, after detection of a −0.04% deviation, the detector will not indicate a change in load conditions until such time as the frequency changes to +0.01%. Similarly, detection of a −0.05% deviation will not indicate a change in load conditions over those of −0.04% deviation. A −0.06% deviation will signal a new load condition which will only change upon reaching −0.04%. The load condition represented by −0.04% will remain until frequency reaches +0.01%. Thus, the detector 34 is capable of ignoring certain frequency deviations while detecting other deviations signaling load and/or load control information.

In order to indicate the load conditions, indicator means in the form of an LED readout 36 which is coupled to the counters 32 through lamp decoder drivers 33 are provided. In the preferred embodiment of the invention, the LED readout 36 is adapted to indicate a percentage of the actual frequency, e.g., −0.03 indicating a frequency variation of 0.03% below 60.00 Hz. The LED readout includes a digit "1" in addition to the numerical frequency variation which is responsive to a digit "1" control 40 coupled to the output of the detector 34. In the preferred embodiment of the invention, the digit "1" will flash when a load and/or load control signal indicating a deviation of −0.04% is detected by the detector 34. The digit "1" will continue to flash until such time as a signal deviation of −0.06% is detected or a signal deviation of +0.01% is detected. When a −0.06% deviation is detected, the digit "1" stops flashing and lights continuously at the LED readout 36. When a deviation of +0.01% is detected at the detector 34, the digit "1" ceases to light at the LED readout 36.

It will of course be appreciated that the system as described in the foregoing is only capable of providing a frequency deviation readout where the frequency deviation does not exceed ±0.2% of 60.00 Hz., i.e., the frequency does not fall below 59.88 Hz. nor go above 60.12 Hz. In this connection, an overflow/underflow lamp blanking and sign flash control 42 is provided which blanks the numerical readout by controlling the lamp decoder drivers 38 and causes the appropriate plus or minus sign of the LED readout 36 to flash.

In accordance with another important aspect of the invention, the digit "1" control 40 may be coupled to a load control 44 so as to actually control the load. This would permit a customer at the power consuming location to automatically reduce or increase his load in response to the load condition signal without intervening himself. The digit "1" control 40 may also be coupled to a meter control 46 so as to permit the automatic adjustment of the metered rate. In other words, the customer could continue to consume power but the cost per KWH would be adjusted to reflect the more or less expensive cost of generating a unit of power under different load conditions.

As described above, the latch 24 is reset at input R2 in response to output pulses from the reset generator 16 which occur once every 60 cycles of the generating frequency. In order to provide for the testing of the gate and counter circuitry, a test switch 48 is associated with the reset generator 16 which inhibits the output from the frequency divider 14 and, by means of a $10^6$ microsecond decoder 50 produces reset pulses which are applied to reset input R1 through a gate 52 at an interval of $10^6$ microseconds which corresponds exactly to the interval of 60 cycles of the power generated frequency when operating precisely at the nominal rate of 60.00 Hz. The power from the plug 10 is also applied to a 5 volt regulated power supply 13 which provides a regulated supply to the various components of the apparatus through connections not depicted in FIG. 1.

Figure 2:
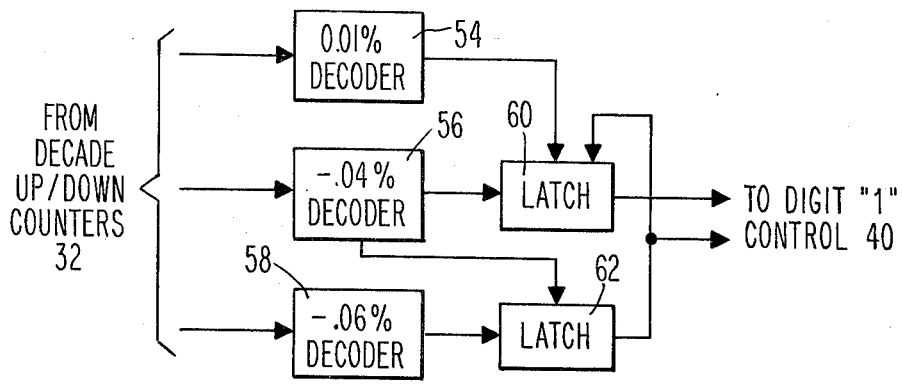
FIG. 2 is a block diagram of the detector shown in FIG. 1.

In accordance with this invention, it is very important to only detect variations or deviations in frequency which are intended to indicate load conditions or a change in load conditions which function is performed by the detector 34. Reference will now be made to FIG. 2 wherein a detector capable of this function is described in detail.

As shown in FIG. 2, detector 34 comprises decoders 54, 56 and 58 which are associated with the counters 32. More specifically, the decoder 54 is coupled to the counters 32 so as to be responsive to a count corresponding to a 60.00 Hz. frequency deviation of −0.01%. Similarly, the decoders 56 and 58 are coupled to the counters 18 so as to be responsive to deviations of −0.04% and −0.06% respectively. Latches 60 and 62 are associated with the decoders 56 and 58 respectively. Until such time as the decoder 56 detects a deviation of −0.04%, the latch 60 will not be set so as to provide the digit "1" control 40 with a signal which would initiate a flashing "1" output at the LED readout 36. After the latch 60 is set, it will only be reset when the decoder 54 produces an output so as to indicate a deviation of +0.01%, or the decoder 58 produces an output so as to indicate a deviation of −0.06%. After a −0.06% deviation has been detected, the latch 62 which produces a continuously lighted "1" at a readout 36 in response to the digit "1" control 40 will only be reset when a deviation no greater than −0.04% has been detected by the decoder 56.

Figure 3:
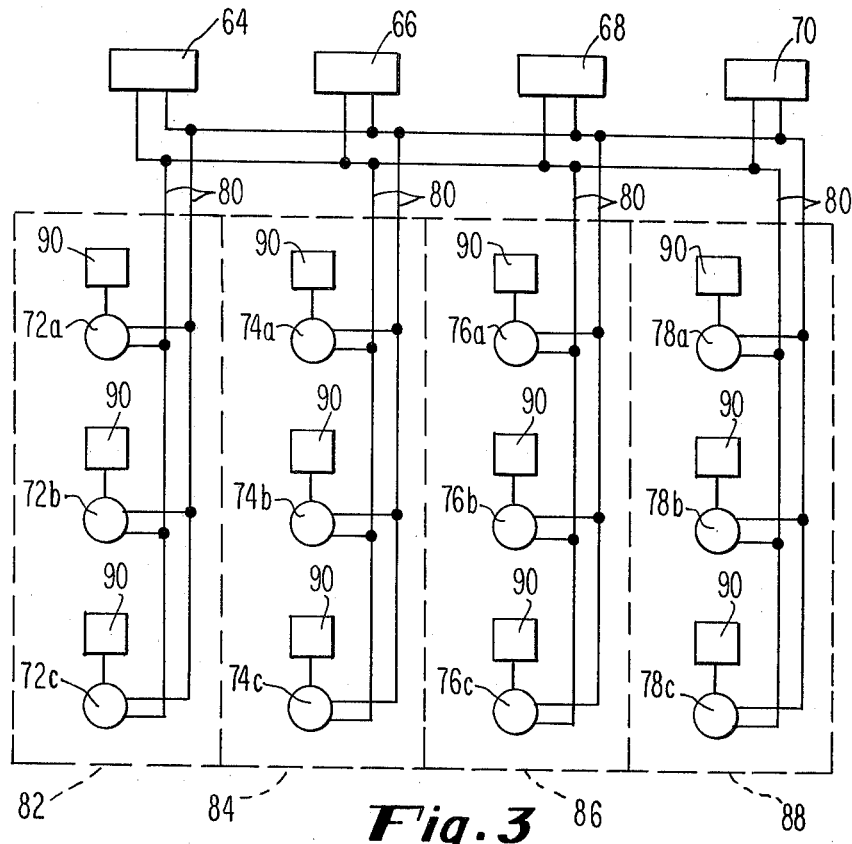
FIG. 3 is a block diagram of a power system including generating sources and loads which extends across a plurality of time zones and incorporates this invention for controlling the loads in those time zones.

In the United States, a power grid may extend across a number of different time or load zones and it may be desirable to signal power consuming locations in one zone to take one course of action at one time and power consuming locations in another zone to take another course of action at another time. As shown in FIG. 3, a power grid comprising power generating sources 64, 66, 68 and 70 are serving a plurality of power consuming locations 72a-c, 74a-c, 76a-c and 78a-c, all of which are connected by lines 80 in four different times zones 82, 84, 86 and 88.

In order to detect signaled load conditions by the generating sources 64, 66, 68 and 70, each of the power consuming locations 72a-c, 74(a-c), 76(a-c) and 78(a-c) includes apparatus 90 of the type shown in FIGS. 1 and 2 so as to detect the load conditions being signaled. However, in order to achieve phased loading of the system or phase changes in metering rates, the apparatus 90 in the various zones 82, 84, 86 and 88 are provided with a capacity to detect load condition signals only during predetermined time frames. For example, the apparatus 90 associated with the power consuming locations 72(a-c) in the zone 82 could detect load condition signals in the first 15 minutes after the hour and are inhibited the remainder of the hour. Similarly, the apparatus 90 in the next time zone 84 may detect load condition signals in the second 15 minutes after the hour and are inhibited the remainder of the hour.

Figure 4:
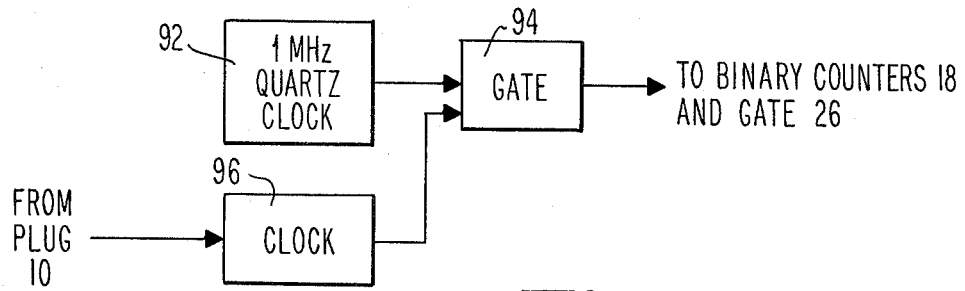
FIG. 4 is a block diagram of a source of clock pulses which may be employed in the apparatus of FIG. 1 for use in the system of FIG. 3.

FIG. 4 discloses a modification in the circuit of FIG. 1 which may be utilized to achieve the phased load condition detection illustrated in FIG. 3. In particular, FIG. 4 discloses circuitry which would be utilized to replace the clock pulse source 20 shown in FIG. 1. As shown in FIG. 4, a 1 MHz. quartz clock 92 is applied to a gate 94 which is enabled by a time of day clock 96 driven by accurate means such as the clock 92. The output from the gate 94 which is enabled at the appropriate segment of the hour the clock 96 is applied to the counters 18 and the gate 26.

The apparatus described in the foregoing is designed to operate with a 60.00 Hz. generating frequency presumably at a voltage of 100 to 125 volts. The detected generating frequency deviation is limited to 60.00 Hz. plus or minus 0.2% or 59.88 to 60.12 Hz. Furthermore, the apparatus is adapted to indicate a moderate loading condition with a −0.04% deviation or 59.94 Hz. and a heavy load condition at a −0.06% deviation or 59.94 Hz. It will of course be appreciated that the specific frequency choices of deviation have been arbitrarily chosen and other frequencies and deviations may be utilized to indicate the load and/or load control information. Moreover, it is possible to rely upon a rate of change of frequency rather than the actual frequency itself to indicate load and/or load control information. Accordingly, the use of the word change, variation or deviation in describing the invention herein and in the claims is intended to embrace changes in frequency as well as rates of change in frequency for signaling purposes or any suitable combination thereof.

Although specific embodiments of the invention have been shown and described, it will be appreciated that various modifications may be made without departing from the true spirit and scope of the invention as set forth in the claims.

What is claimed is:

1. A method of operating a power system comprising power generating means and a load including a plurality of power consuming locations, said method comprising the following steps:

generating power for the system at a nominal standard frequency;

controllably varying in a predetermined manner the frequency of the power from said nominal standard to signal load and/or load control information;

varying the frequency of the power from said nominal standard without signaling load and/or load control information;

detecting at one of said power consuming locations one variation in the frequency signaling load and/or load control information while ignoring said one variation at another of said locations;

detecting at said other of said locations another variation in the frequency signaling load and/or load control information while ignoring said other variation at said one of said locations;

ignoring variations in the frequency not signaling load and/or load control information at said locations; and generating a load indicating signal at said detecting power consuming locations in response to the detected variations signaling load and/or load control information.

2. The method of claim 1 wherein said variation in said frequency signaling load and/or load control information comprises a frequency deviation of predetermined magnitude.

3. The method of claim 2 wherein a subsequent frequency deviation closer to said nominal standard frequency than said deviation indicating load and/or load control information will continue to produce the same load indicating signal until a reset frequency is detected.

4. The method of claim 1 wherein said variation in frequency signaling load and/or load control information comprises a plurality of frequency deviations of predetermined magnitude.

5. The method of claim 1 wherein subsequent frequency variations closer to said nominal standard frequency than said plurality of frequency deviations will continue to produce the same load indicating signal until respective reset frequencies are detected.

6. The method of claim 1 further comprising the step of controlling the load at the power consuming location in response to said load indicating signal.

7. The method of claim 1 wherein detection of variations in the frequency are enabled at one time at said one of said power consuming locations and another time at said other of said locations.

8. The method of claim 7 wherein the loads at the power consuming locations are automatically varied at said one time and said other time in response to the detected variations in the frequency at said one time and said other time.

9. The method of claim 1 including the step of varying the rate of metering for power consumed at the power consuming locations in response to detected variations in frequency at different times.

10. A method of operating a power system comprising power generating means and a load including a plurality of power consuming locations, said method comprising the following steps:

generating power for the system at a nominal standard frequency;

controllably varying in a predetermined manner the frequency of the power from said nominal standard frequency to signal load and/or load control information;

varying the frequency of the power from said nominal standard without signaling load and/or load control information;

detecting at at least one of said power consuming locations one variation in the frequency signaling load and/or load control information;

ignoring variations in the frequency not signaling load and/or load control information at said locations; and generating a load indicating signal at said locations in response to the detected variation signaling load and/or load control information.

* * * * *